(12) United States Patent
Brinas

(10) Patent No.: US 9,937,774 B2
(45) Date of Patent: Apr. 10, 2018

(54) REMOTE OUTLET VANE CONTROL SYSTEM

(71) Applicant: GM GLOBAL TECHNOLOGY OPERATIONS LLC, Detroit, MI (US)

(72) Inventor: Gerard A. Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

(21) Appl. No.: 14/835,126

(22) Filed: Aug. 25, 2015

(65) Prior Publication Data
US 2017/0057325 A1 Mar. 2, 2017

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC ... B60H 1/3414; B60H 1/3415; B60H 1/3428

USPC ............... 454/152, 153, 154, 155
See application file for complete search history.

(56) References Cited

U.S. PATENT DOCUMENTS

2004/0203334 A1* 10/2004 Shibata ............... B60H 1/3428
454/155

* cited by examiner

*Primary Examiner* — Vivek Shirsat
(74) *Attorney, Agent, or Firm* — Quinn IP Law

(57) ABSTRACT

An air vent includes a housing extending between an inlet opening and an outlet opening, such that the housing defines a substantially closed air path between the inlet opening and the outlet opening. A first vane is disposed within the air path and is configured to rotate about a first axis. A second vane is disposed within the air path and is configured to rotate about a second axis, which is substantially orthogonal to the first axis. A controller is configured to rotate the first vane about the first axis and to rotate the second vane about the second axis. The controller is disposed outside of the air path, such that both the first vane and the second vane are adjustable from outside of the air path.

7 Claims, 4 Drawing Sheets

REMOTE OUTLET VANE CONTROL SYSTEM

TECHNICAL FIELD

This disclosure generally relates to an air vent, and air vent controls, such as those used in vehicles, equipment, and the like.

BACKGROUND

Many passenger vehicles include a heating, ventilation, and air conditioning (HVAC) system that allows a vehicle occupant to control the temperature or adjust other settings of a vehicle interior. For instance, a fan or blower circulates conditioned air to the vehicle interior through one or more vents.

SUMMARY

An air vent for a heating, ventilation, and air conditioning system, such as those used in vehicles and other equipment, is provided. The air vent includes a housing extending generally longitudinally between an inlet opening and an outlet opening, such that the housing defines a substantially closed air path between the inlet opening and the outlet opening.

A first vane is disposed within the air path and is configured to rotate about a first axis. A second vane is disposed within the air path and is configured to rotate about a second axis, which is substantially orthogonal to the first axis.

A controller is configured to rotate the first vane about the first axis and to rotate the second vane about the second axis. The controller is disposed outside of the air path, such that both the first vane and the second vane are adjustable from outside of the air path.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
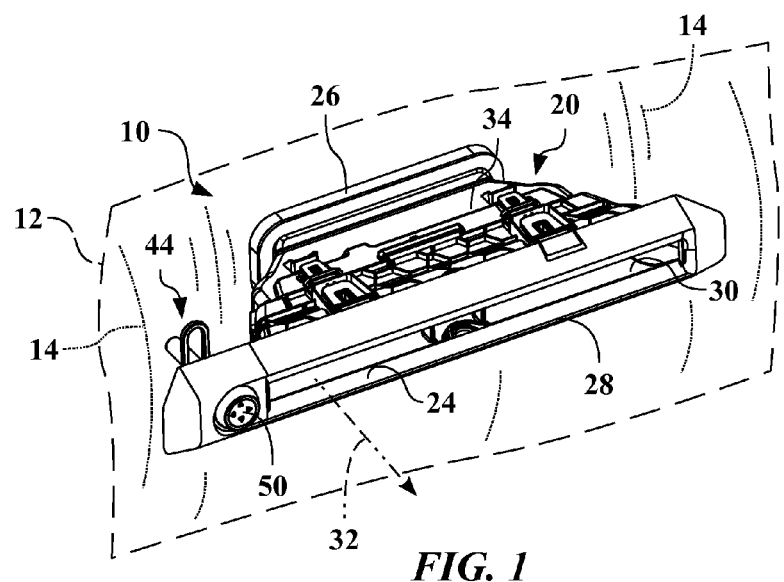
FIG. 1 is a schematic, isometric view of an air vent usable with vehicle or other HVAC systems.

Referring to the drawings, wherein like reference numbers correspond to like or similar components whenever possible throughout the several figures, there is shown in FIG. 1 an isometric view of an air vent 10 for a vehicle 12. Only a portion of the vehicle 12—in particular, a dashboard 14, is shown schematically in FIG. 1—to illustrate possible surroundings for the structures described herein. The air vent 10 may be part of a heating, ventilation, and air conditioning (HVAC) system.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Figure 2:
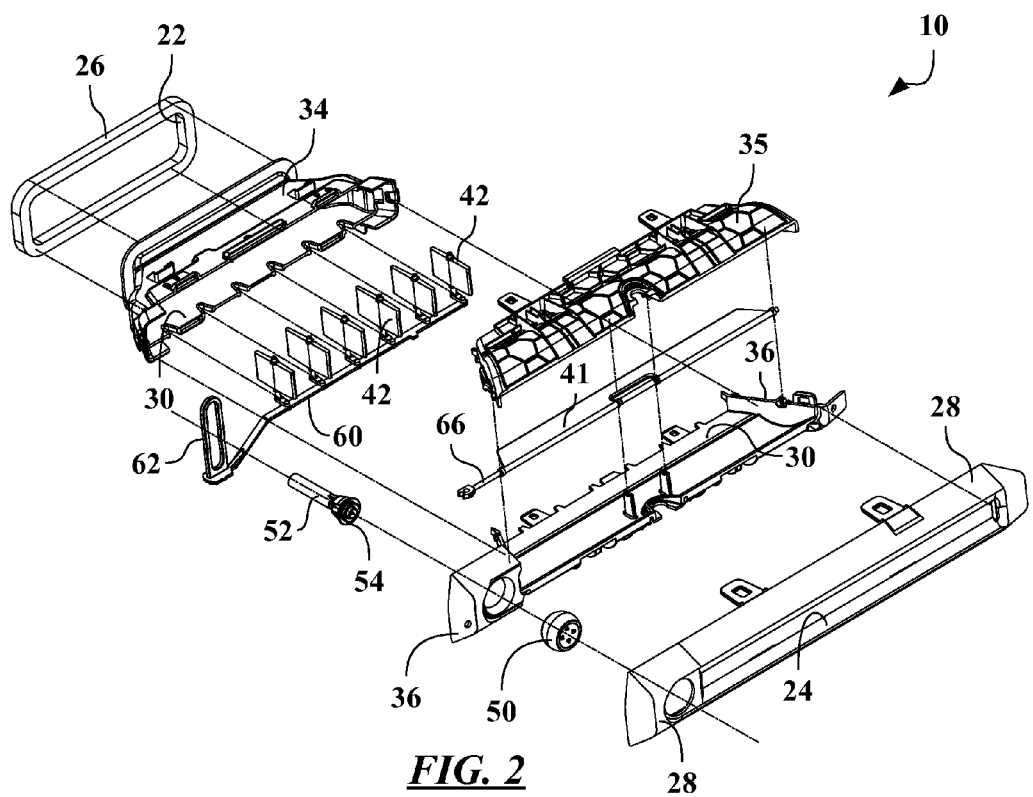
FIG. 2 is a schematic, exploded view of the air vent shown in FIG. 1.

Referring also to FIG. 2, and with continued reference to FIG. 1, there is shown an exploded view of the air vent 10. A housing 20 extends longitudinally and defines an inlet opening 22 and an outlet opening 24. In the example configuration shown, the inlet opening 22 is at least partially defined by an inlet plate 26 and the outlet opening 24 is at least partially defined by a face plate 28. Both the inlet opening 22 and the outlet opening 24 are transversely oriented, such that the air vent has a low or thin profile but is capable to transferring a substantial volume of air. Note that the structures described herein may be useful with other shapes or geometries of the air vent 10.

The face plate 28 is generally flush with the surrounding structure, for example the dashboard 14, into which the air vent 10 is mounted. The housing 20 defines an air path 30 between the inlet opening 22 and the outlet opening 24. The air path 30 may be substantially closed in some embodiments. The air vent 10 directs airflow from the air path 30 into the vehicle 12 along a selectable direction referred to as an exit vector or exit flow 32 in the examples shown.

The inlet plate 26 and the face plate 28 may be considered portions of the housing 20. As shown in the exploded view of FIG. 2, the housing 20 may be formed from additional components, such as a plenum 34, an upper plate 35 and a lower plate 36.

In addition to the dashboard 14 shown schematically in the figures, the air vent 10 may be located in other portions or areas of the vehicle 12. For example, and without limitation, the air vent 10 may be mounted in: a center stack or console positioned between the driver-side seat and the passenger-side seats; in one of the front or rear passenger seats; within a ceiling or floor; or within one or more pillars (i.e., an A-pillar or B-pillar, such that the air vent 10 may be vertically oriented). Furthermore, the air vent 10 may be incorporated in applications other than vehicles. For example, it could be applied to residential or commercial furniture, such as recliners or couches. In addition, the air vent 10 may also be incorporated into HVAC systems of buildings or mobile housing in still other embodiments.

A first vane 41 is movably disposed within the air path 30. The first vane 41 is configured to rotate about a first axis, which is generally horizontal in the figures. The first vane 41 directs or moves the exit flow 32 along a first direction, the vertical direction. In the configuration shown, the first vane 41 is a single blade.

A second vane 42 is movably disposed within the air path 30. The second vane 42 is configured to rotate about a second axis, a vertical axis that is substantially orthogonal to the first axis. The second vane 42 directs or alters the exit flow 32 through the outlet opening 24 in a second direction, which is the horizontal direction in the figures. In the configuration shown, the second vane 42 is formed from a plurality of smaller blades, as compared to the single blade of the first vane 41, which may be collectively referred to as the second vane 42. In other configurations, the second vane 42 may be a single blade.

Referring now to FIGS. 3-9, and with continued reference to FIGS. 1-2, there are shown additional views of the air vent 10. These views illustrate actuation and operation of the air vent 10 to selectively change or direct the exit flow 32 of air delivered by the air vent 10.

Figure 3:
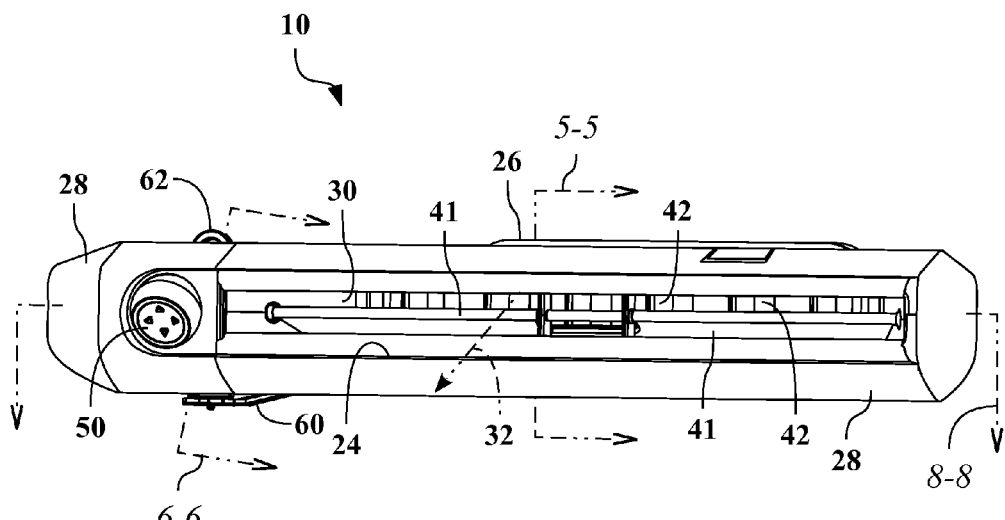
FIG. 3 is a schematic, front view of the air vent shown in FIGS. 1-2 directing exit flow downward.
Figure 4:
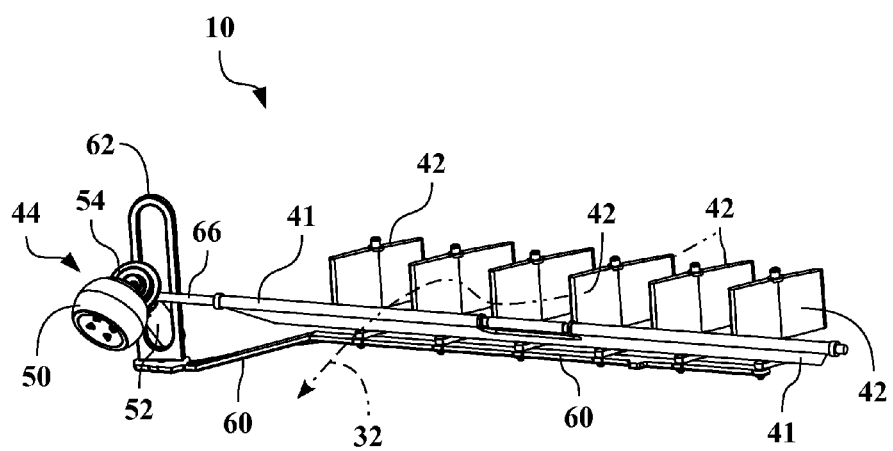
FIG. 4 is a schematic, isometric view of the air vent shown in FIGS. 1-3, with an outer housing removed for illustrative purposes, shown with a controller directing exit flow downward and to the left.

FIG. 3 shows the assembled air vent from a front angle view, with the exit flow 32 directed generally downward. FIG. 4 shows an isometric view of the air vent 10 with the housing 20 hidden from view to illustrate how the first vane 41 and the second vane 42 may be controlled to direct the exit path downward and leftward.

As illustrated in FIGS. 3-4, an adjuster or controller 44 is operatively attached to the first vane 41 and the second vane 42. The first vane 41 and the second vane 42 have a mechanical connection to the controller 44, as opposed to an electrical (or by wire) connection. In the example configuration shown, the controller 44 is the only controller for adjustment of the air vent 10, such that it may be referred to as a single controller. The controller 44 is configured to rotate the first vane 41 about the first axis (the horizontal axis, in the configuration shown) and also to rotate the second vane 42 and the second axis (the vertical axis, in the configuration shown). Therefore, the controller 44 simultaneously alters, adjusts, or controls two directions or axes of variation in air flow from the air vent 10, such that the controller 44 is the only device adjusting air flow from the air vent 10. This allows, in some embodiments, for the air flow to be controlled without any additional control knobs or sticks.

Note that the controller 44 shown is disposed entirely outside of the air path 30, such that both the first vane 41 and the second vane 42 are adjusted and controlled from outside of the air path 30. If the controller 44, or any associated linkages, were located inside of the air path 30, those control systems could restrict the flow of air through the air vent 10.

The controller 44 may be effecting movement of the first vane 41 and the second vane 42 individually, or may be simultaneously adjusting movement of both the first vane 41 and the second vane 42—i.e., dual-axis control over the exit flow 32 from the controller 44. As shown in FIG. 4, the exit flow 32 is directed downward and leftward, without requirement for the user to manipulate two different control knobs, sliders, or sticks.

Figure 5:
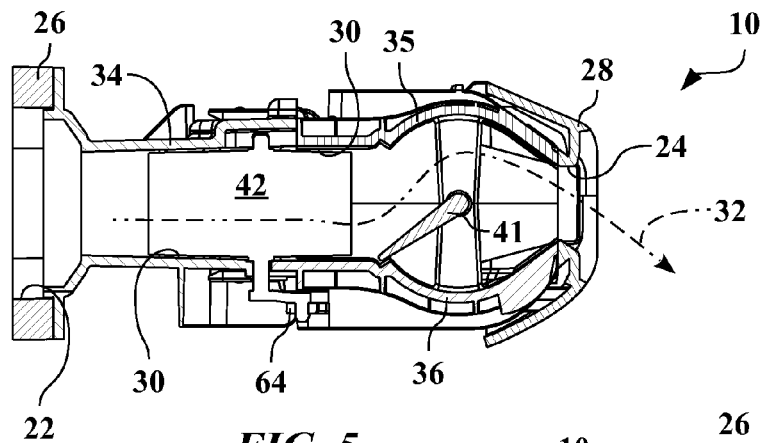
FIG. 5 is a schematic, cross-sectional view of the air vent taken generally along a line 5-5 of FIG. 3, illustrating the air vent directing exit flow downward.
Figure 6:
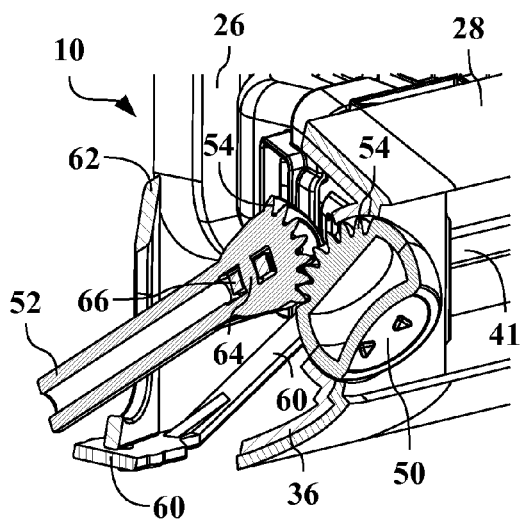
FIG. 6 is another schematic, cross-sectional view of the air vent taken generally along a line 6-6 of FIG. 3, illustrating the controller of the air vent directing exit flow downward.
Figure 7:
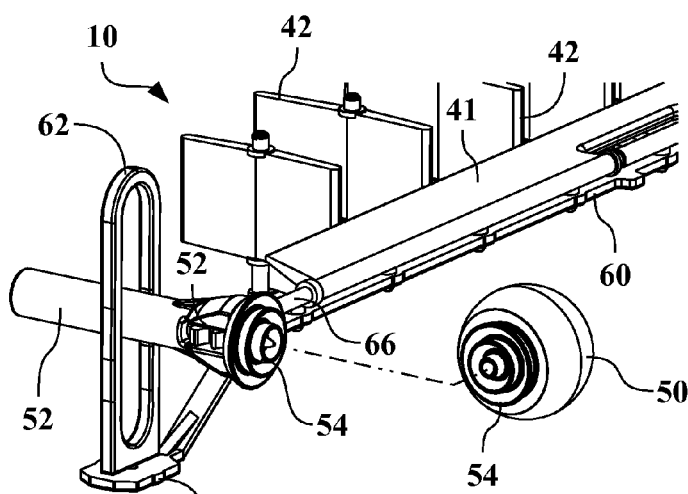
FIG. 7 is a schematic, partially exploded view of the air vent shown in FIGS. 1-7, illustrating a spherical gear of the controller.

FIG. 5 schematically illustrates a cross section of the air vent 10 taken generally along a line 5-5 of FIG. 3. FIG. 6 schematically illustrates a cross section of the air vent 10 taken generally along a line 6-6 of FIG. 3, which sections the controller 44. FIG. 7 shows a partially exploded isometric view of the air vent 10, and illustrates the components of the controller 44. In FIGS. 3, 5 and 6, the controller 44 is adjusting the air vent 10 to direct the exit flow 32 downward.

As shown by FIGS. 3-7, the controller 44 actuates the first vane 41 and the second vane 42 to direct air flowing through the air path 30. In FIGS. 3-6, the first vane 41 is oriented or aligned to direct the exit flow 32 downward. Note that, as illustrated in FIG. 5, the first vane 41 closes off the lower region of the housing 20, which forces air to move above the first vane 41. However, the housing 20 has a barrel shape just prior to the outlet opening 24. This barrel shape—particularly, the portion formed in the upper plate 35—directs air downward when the lower portion is closed off by the first vane 41.

As best viewed in FIGS. 6 and 7, the controller 44 of the air vent 10 in formed as two separate pieces. The controller 44 includes a thumb knob 50 and a control stick 52, which are linked by a spherical gear 54 partially formed on both components.

The thumb knob 50 extends forward beyond the face plate 28, such that the thumb knob 50 is outside of the housing 20 and accessible to the user or operator. The control stick 52 is behind the face plate 28 and is operatively connected to the first vane 41 and the second vane 42.

In use, the operator moves the thumb knob 50 to point in the same direction that the operator desires of the exit flow 32. Via the spherical gear 54, the thumb knob 50 rotates the control stick 52 in the opposite the direction of movement or rotation of the thumb knob 50.

The spherical gear 54, as best viewed in FIGS. 6 and 7, allows connection between the thumb knob 50 and the control stick 52 at substantially any angle. Furthermore, the thumb knob 50 translates rotation to the control stick 52 about two axes simultaneously for smooth, and direct, movement between positions of the controller 44. For any cross section taken through the center of the controller 44, the spherical gear 54 portions of the thumb knob 50 and the control stick 52 will look substantially identical to the section shown in FIG. 6.

As illustrated in FIGS. 2, 4, 6, and 7, a tie rod 60 is connected to each blade of the second vane 42 and a slot arm 62 is pivotally connected to the tie rod 60. The slot arm 62 transfers horizontal movement of the control stick 52 to the tie rod 60, but a slot defined perpendicularly to the tie rod 60 allows the control stick 52 to translate within the slot vertically relative to the tie rod 60. Therefore, leftward and rightward movement of the thumb knob 50 is transferred by the control stick 52 to tie rod 60—as leftward and rightward movement, respectively—but upward and downward movement is not.

The blades of the second vane 42 pivot about the second axes via anchor points formed in the housing 20. Therefore, linear translation of the tie rod 60 causes the blades of the second vane 42 to rotate.

As best viewed in the FIGS. 6 and 7, a pin 64 is formed in the control stick 52 and a vane arm 66 extends from the first vane 41. The pin 64 connects the vane arm 66 to the control stick 52. When the control stick 52 moves vertically, the vane arm 66 and the first vane 41 rotate about the first axis, which alters the vertical orientation of the exit flow 32. However, when the control stick 52 moves horizontally, the vane arm 66 allows the control stick 52 to pivot about the pin 64, such that no horizontal movement is transferred from the control stick 52 to the first vane 41.

Note that the thumb knob 50 points in substantially the same direction as the exit flow 32 from the outlet opening 24. In the configuration of FIG. 3, the thumb knob 50 is pointed downward, such that the second vane 42 is generally straight and the first vane 41 is angled downward - i.e., closing off air flow through the lower portion of the housing 20 - and the exit flow 32 is generally downward.

Similarly, in the configuration of FIG. 4, the thumb knob 50 is pointed downward and leftward. In this configuration, the second vane 42 is angled to the left and the first vane 41 is angled downward, such that the exit flow 32 is generally downward and leftward. The relationship between the direction of the thumb knob 50 and the exit flow 32 may not be exact. However, it is more intuitive for the operator of the air vent 10 to point the controller 44 generally in the direction desired of the exit flow 32 than to have to reverse a stick or knob relative to the desired flow.

Figure 8:
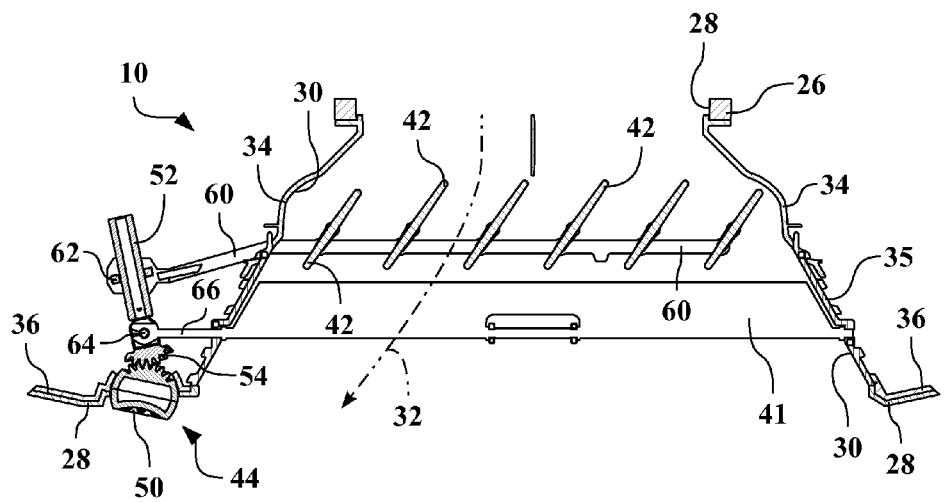
FIG. 8 is a schematic, cross-sectional top view of the air vent taken generally along a line 8-8 of FIG. 3, illustrating the controller of the air vent directing exit flow leftward.
Figure 9:
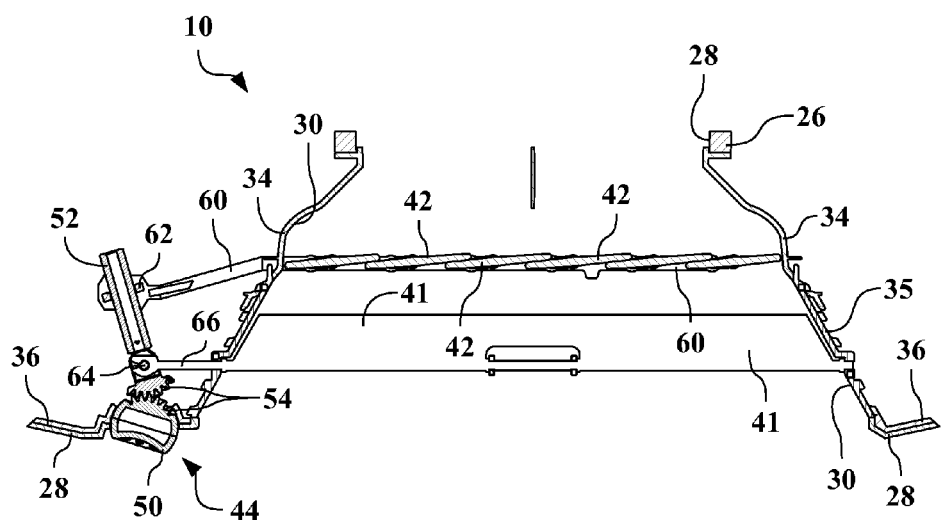
FIG. 9 is a schematic, cross-sectional top view of the air vent taken from the same viewpoint as FIG. 8, illustrating the controller of the air vent substantially closing off or preventing exit flow.

FIGS. 8 and 9 further illustrate horizontal adjustment, and complete closure, of the air vent 10. FIG. 8 shows the air vent 10 directing the exit flow 32 to the left, and FIG. 9 shows the air vent 10 blocking the air path 30, such that there is substantially no exit flow 32 in FIG. 9.

FIGS. 8 and 9 are sectioned generally along a line 8-8 of FIG. 3. Note, however, that in order to illustrate the interaction between the tie rod 60 and the second vane 42, the housing 20 is shown with a plane-intersection view in FIGS. 8 and 9, such that portions of the housing 20 beyond the section plane, such as portions of the lower plate 36 and the inlet plate 26, are hidden from view.

As the thumb knob 50 is moved leftward, the spherical gear 54 causes the control stick 52 to also move leftward. The slot arm 62 translates the horizontal movement of the control stick 52 to the tie rod 60. Note that the slot arm 62 rotates slightly, to maintain contact with the control stick 52, about the end of the tie rod 60.

Leftward movement of the tie rod 60 applies twist to the pivot points of the blades of the second vane 42, such that they pivot clockwise (as viewed in FIGS. 8 and 9) and direct air to the left. As shown in FIGS. 8 and 9, the control stick 52 pivots about the vane arm 66 on the pin 64.

The first vane 41 is supported by, and pivots at, cradle points on the housing 20, in particular on the lower plate 36 and the upper plate 35. The second vane 42 is supported by, and pivots at, cradle points on the housing 20, in particular on the plenum 34. The control stick 52 of the controller 44 is supported by, and pivots at, the vane arm 66. The thumb knob 50 of the controller 44 is supported by, and pivots at, the face plate 28 and a corresponding portion of the lower plate 36.

In the position shown in FIG. 9, the thumb knob 50 is moved to the far left. This causes the control stick 52 to move the tie rod 60 further to the left, which results in additional rotation of the second vane 42. This position effectively closes the air vent 10 and prevents any flow through the air path 30, such that the operator may selectively stop airflow completely, which is beneficial in configurations having multiple air vents 10.

The detailed description and the drawings or figures are supportive and descriptive of the subject matter discussed herein. While some of the best modes and other embodiments for have been described in detail, various alternative designs, configurations, and embodiments exist.

The invention claimed is:

1. An air vent for a heating, ventilation, and air conditioning system, the air vent comprising:
   a housing defining an inlet opening and an outlet opening, wherein the housing further defines an air path extending between the inlet opening and the outlet opening;
   a first vane disposed within the air path and configured to rotate about a first axis;
   a second vane disposed within the air path and configured to rotate about a second axis, which is orthogonal to the first axis;
   a controller configured to rotate the first vane about the first axis and to rotate the second vane about the second axis, wherein the controller is disposed outside of the air path, such that both the first vane and the second vane are adjustable from outside of the air path, wherein the controller simultaneously adjusts both the first vane about the first axis and the second vane about the second axis;
   a thumb knob extending outside of the housing; and
   a control stick operatively connected to the first vane and the second vane, wherein the thumb knob points in the same direction as the exit flow from the outlet opening; and a spherical gear linking the thumb knob to the control stick, such that the thumb knob translates rotation to the control stick about two axes simultaneously.

2. The air vent of claim 1, wherein the controller selectively rotates the second vane about the second axis to block air flow through the air path.

3. The air vent of claim 2, further comprising:
   a tie rod operatively connected to, and configured to rotate, the second vane about the second axis; and
   a slot arm operatively connected to, and configured to translate, the tie rod, wherein the slot arm defines a slot in which the control stick translates perpendicular to the tie rod.

4. The air vent of claim 3, wherein the control stick pivots about the first vane.

5. An air vent for a heating, ventilation, and air conditioning system, the air vent comprising:
   a housing defining an inlet opening and an outlet opening, wherein the housing further defines an air path between the inlet opening and the outlet opening;
   a first vane disposed within the air path and configured to rotate about a first axis;
   a second vane disposed within the air path and configured to rotate about a second axis, which is substantially orthogonal to the first axis; and
   a controller configured to rotate the first vane about the first axis and to rotate the second vane about the second axis, wherein the controller is disposed outside of the air path, such that both the first vane and the second vane are adjustable from outside of the air path, and includes:
   a thumb knob extending outside of the housing;
   a control stick operatively connected to the first vane and the second vane; and
   a spherical gear linking the thumb knob to the control stick, such that the thumb knob translates rotation to the control stick about two axes simultaneously, wherein the thumb knob points in substantially the same direction as the exit flow from the outlet opening.

6. The air vent of claim 5, further comprising:
   a tie rod operatively connected to, and configured to rotate, the second vane about the second axis; and
   a slot arm operatively connected to, and configured to translate, the tie rod, wherein the slot arm defines a slot in which the control stick translates substantially perpendicularly to the tie rod.

7. The air vent of claim 6, wherein the control stick pivots about the first vane.

* * * * *